United States Patent [19]
Marsh et al.

[11] Patent Number: 5,530,799
[45] Date of Patent: Jun. 25, 1996

[54] RENDERING CACHE IN AN OBJECT ORIENTED SYSTEM

[75] Inventors: Donald M. Marsh, Mountain View; Maire L. Howard, San Jose, both of Calif.

[73] Assignee: Taligent Inc.

[21] Appl. No.: 169,862

[22] Filed: Dec. 17, 1993

[51] Int. Cl.⁶ ................................................. G06F 12/00
[52] U.S. Cl. ................... 395/164; 395/445; 364/DIG. 1
[58] Field of Search .................................. 395/162, 164, 395/445, 600

[56] References Cited

U.S. PATENT DOCUMENTS

| | | | |
|---|---|---|---|
| 4,821,220 | 4/1989 | Duisburg | 364/578 |
| 4,885,717 | 12/1989 | Beck et al. | 395/775 |
| 4,891,630 | 1/1990 | Friedman et al. | 345/156 |
| 4,953,080 | 8/1990 | Dusart et al. | 395/600 |
| 5,041,992 | 8/1991 | Cunningham et al. | 395/135 |
| 5,050,090 | 9/1991 | Golub et al. | 364/478 |
| 5,060,276 | 10/1991 | Morris et al. | 382/151 |
| 5,075,848 | 12/1991 | Lai et al. | 395/479 |
| 5,093,914 | 3/1992 | Caplien et al. | 19/15 |
| 5,119,475 | 6/1992 | Smith et al. | 213/177 |
| 5,125,091 | 6/1992 | Staas, Jr. et al. | 220/611 |
| 5,133,075 | 7/1992 | Risch | 395/800 |
| 5,136,705 | 8/1992 | Stubbs et al. | 395/183.03 |
| 5,151,987 | 9/1992 | Abraham et al. | 395/182.18 |
| 5,181,162 | 1/1993 | Smith et al. | 364/419.19 |
| 5,208,908 | 5/1993 | Harrison et al. | 395/150 |
| 5,263,136 | 11/1993 | De Aguier et al. | 395/164 |
| 5,287,507 | 2/1994 | Hamilton et al. | 395/650 |
| 5,337,408 | 8/1994 | Fung et al. | 395/162 |

FOREIGN PATENT DOCUMENTS

| | | |
|---|---|---|
| 0212016 | 3/1978 | European Pat. Off. . |
| 2266172 | 10/1993 | United Kingdom . |

OTHER PUBLICATIONS

Myers, Ben. "Video Cards revisted: How fast is fast?", PC Magazine, V12, n13 p. 251(6), Jul. 1993.

Wolczko, M. et al. "The influence of the object–oriented language model on a supporting architecture", System Sciences, 1993 Annual Hawaii Int'l, pp. 182–191.

Chang, J. et al, "Object Caching for Performance in object-oriented Systems", Computer Design—ICCD '91, 1991, Int'l Conf., pp. 379–385.

Campbell, Roy et al, "Designing and implementing choices: an object–oriented system in CTT", Comm. of the ACM, v36, n9 pp. 117(10) Sep. 1993.

Computer Technology Review, V.11(4), Oct. 1991, Los Angeles, US, pp. 14–17, Mera "DSP and Open Real Time OS Target Multimedia Applications".

Software Practice & Experience, V.23(8), Aug. 1993, Chichester, GB, pp. 871–893, Dunlavey "Differntial Evaluation: A Cache–Based Techinque for Incremental Update of Graphical Displays of Structures".

*Primary Examiner*—Rebecca L. Rudolph
*Attorney, Agent, or Firm*—Keith Stephens

[57] ABSTRACT

A method and system for caching graphic information for display in a graphics processing system to avoid repeated rendering each time a graphic is required to be re drawn. A developer of an application program can specify which graphic objects should be cached, and request that caching be carried out for those graphics. Devices may also specify whether caching is desired, and this preference may be overridden by the caching system. The caching system may create a single cache object for several devices, or may create several cache objects for corresponding devices, depending on the characteristics of the devices. The objects are cached in a device-dependent manner. The cached graphic may be sent to methods and devices in the same mariner that any other graphic is sent.

26 Claims, 10 Drawing Sheets

Figure 12

RENDERING CACHE IN AN OBJECT ORIENTED SYSTEM

FIELD OF THE INVENTION

This invention generally relates to improvements in computer systems, and more particularly to a system and method for rendering graphics from a cache in an object oriented system.

BACKGROUND OF THE INVENTION

Graphics processing involves a wide range of types of processing. Some graphic operations are highly repetitive, with little or no change from one performance to another. Other operations, however, are extremely dynamic, having many changes from one performance to the next. For example, many rendering operations require repeated drawing of the same graphic. Operations which include such repeated renderings of an identical object include dragging, frequently refreshed or recomposited graphics, an icon being duplicated numerous times, or sprites.

Caching systems are well-known in data processing. Typically, a cache system is composed of a small fast storage device which contains a "snapshot" of information from a larger, slower memory. The snapshot is considered by the particular implementation to be the most relevant information to the processing occurring during the current time period. There are numerous algorithms for caching which attempt to maximize the use of the fast cache memory to avoid going to the slow backing store for information.

A cache manager is used to handle the flow of information between the cache, the device requesting information, and the large backing store. The manager is transparent to the user, and runs algorithms which generally review the flow of information, and from the review attempts to maximize the speed of the cache. For example, if a particular piece of data is found to be used frequently, that piece of data will be kept in the cache. The manager must also manage the updating of information which occurs.

While caching systems work toward optimizing speed of overall system operation, they typically lack flexibility relative to the designer of the particular applications which are run on the computer. The prior art cache system typically merely monitors data usage, and responds to the usage in a mechanistic manner by applying the caching algorithm based on the monitored usage. Such a system often does not take into account any particular nuances of the data beyond usage.

Moreover, prior art caching systems are relatively static with respect to particular types of information, and are not capable of flexibly handling different types of information to uniquely provide particular caching techniques according to the information type.

Graphics systems take descriptions of information to be displayed and "render" the information as an entity on a display device. If the displayed information does not change the process of rendering need only occur once to a display buffer. When information is changed, the information must be re-rendered to reflect the change desired. For complex graphics scenes re-rendering can require massive processing for only incremental changes in the scene or particular graphic. Put another way, the processing required for re-rendering is disproportional to the level of resulting change in the scene or graphic.

SUMMARY OF THE INVENTION

Accordingly, it is a primary object of the present invention to provide a system and method for accelerating graphics processing.

It is a further object of the present invention to provide a system and method for caching in a graphics processing system.

It is yet another object of the present invention to provide a system and method for providing caching in an object oriented environment.

It is still another object of the present invention to provide a system and method for allowing a developer control of the caching properties in a graphics processing system.

It is another object of the present invention to provide a system and method for rendering graphic information to a cache.

These and other objects are realized by the present system which provides for a flexible caching system in a graphics processing environment. A cache object can be requested to be created by a developer of an application program, which provides the developer with the ability to selectively cache graphics which lend themselves to being cached.

DETAILED DESCRIPTION OF THE INVENTION

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The history of object-oriented programming and the developments of frameworks is well-established in the literature. C++ and Smalltalk have been well-documented and will not be detailed here. Similarly, characteristics of objects, such as encapsulation, polymorphism and inheritance have been discussed at length in the literature and patents. For an excellent survey of object oriented systems, the reader is referred to "Object Oriented Design With Applications" by Grady Booch.

While many object oriented systems are designed to operate on top of a basic operating system performing rudimentary input and output, the present system is used to provide system level support for particular features. It should be kept in mind, however, that innovative objects may also appear in layers above the system level in order to provide object support at different levels of the processing hierarchy.

Figure 1:
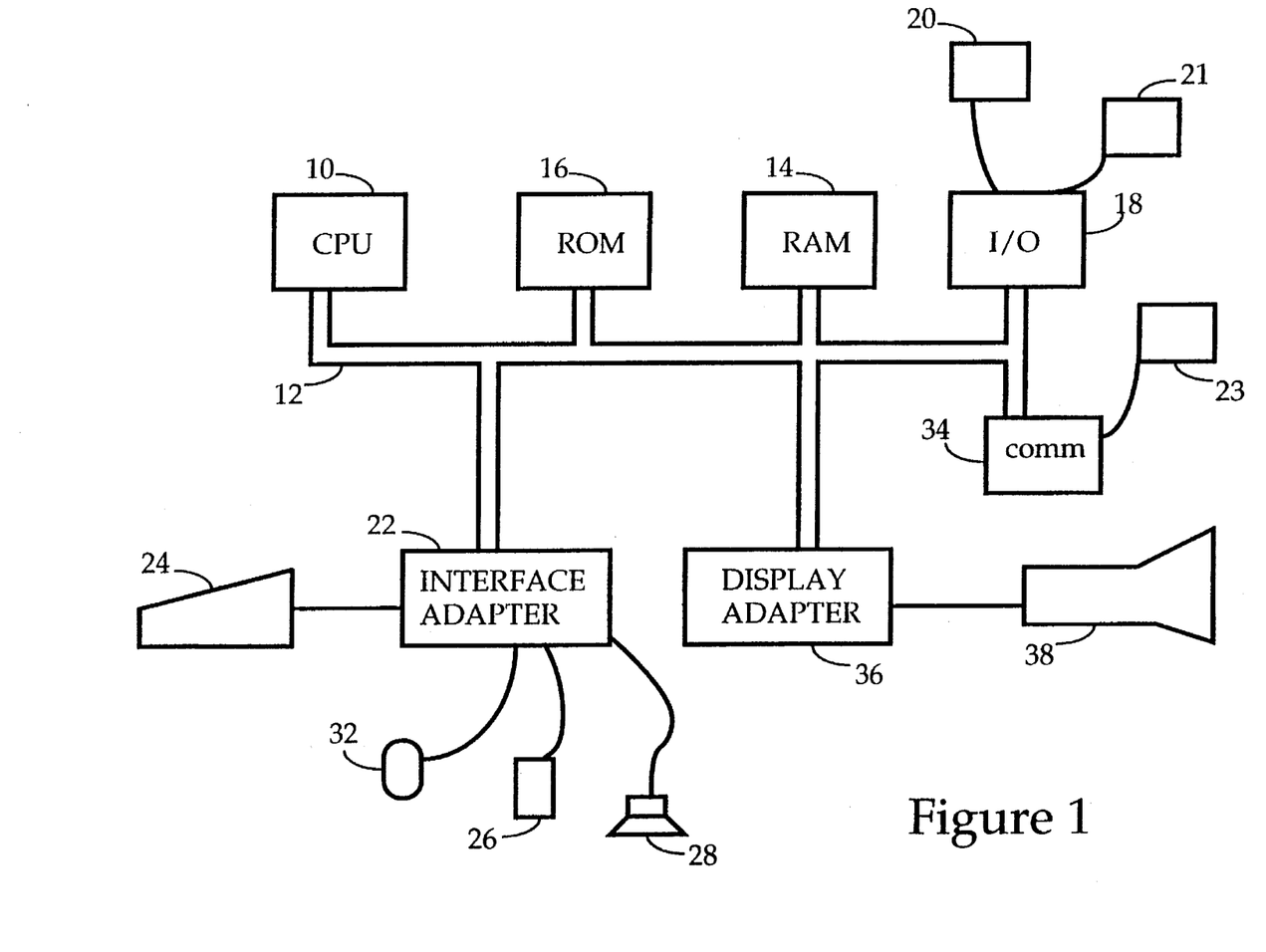
FIG. 1 illustrates a typical hardware configuration of a computer in accordance with the subject invention.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer in accordance with the subject invention having a central processing unit 10, such as a conventional microprocessor, and a number of other units interconnected via a system bus 12. The computer shown in FIG. 1 includes a Read Only Memory (ROM) 16, a Random Access Memory (RAM) 14, an I/O adapter 18 for connecting peripheral devices such as disk units 20 and other I/O peripherals represented by 21 to the system bus 12, a user interface adapter 22 for connecting a keyboard 24, a mouse 32, a speaker 28, a microphone 26, and/or other user interface devices such as a touch screen device (not shown) to the bus 12, a communication adapter 34 for connecting the workstation to a data processing network represented by 23. A display adapter 36 for connecting the bus to a display device 38. The workstation has resident thereon art operating system such as the Apple System/7® operating system.

The system and method of the present invention is for caching rendered graphics to accelerate redrawing, updates, and sprites. There are a number of situations in which a particular graphic must be drawn repeatedly. Examples include a graphic that is being dragged, graphics that are frequently refreshed or recomposited, an icon that is duplicated many times (like folder icons in a finder window), and sprites. In situations where the graphic isn't changing dynamically (aside from positionally), it is useful to cache a device-dependent representation of the graphic instead of rendering it from scratch each time.

Figure 2:
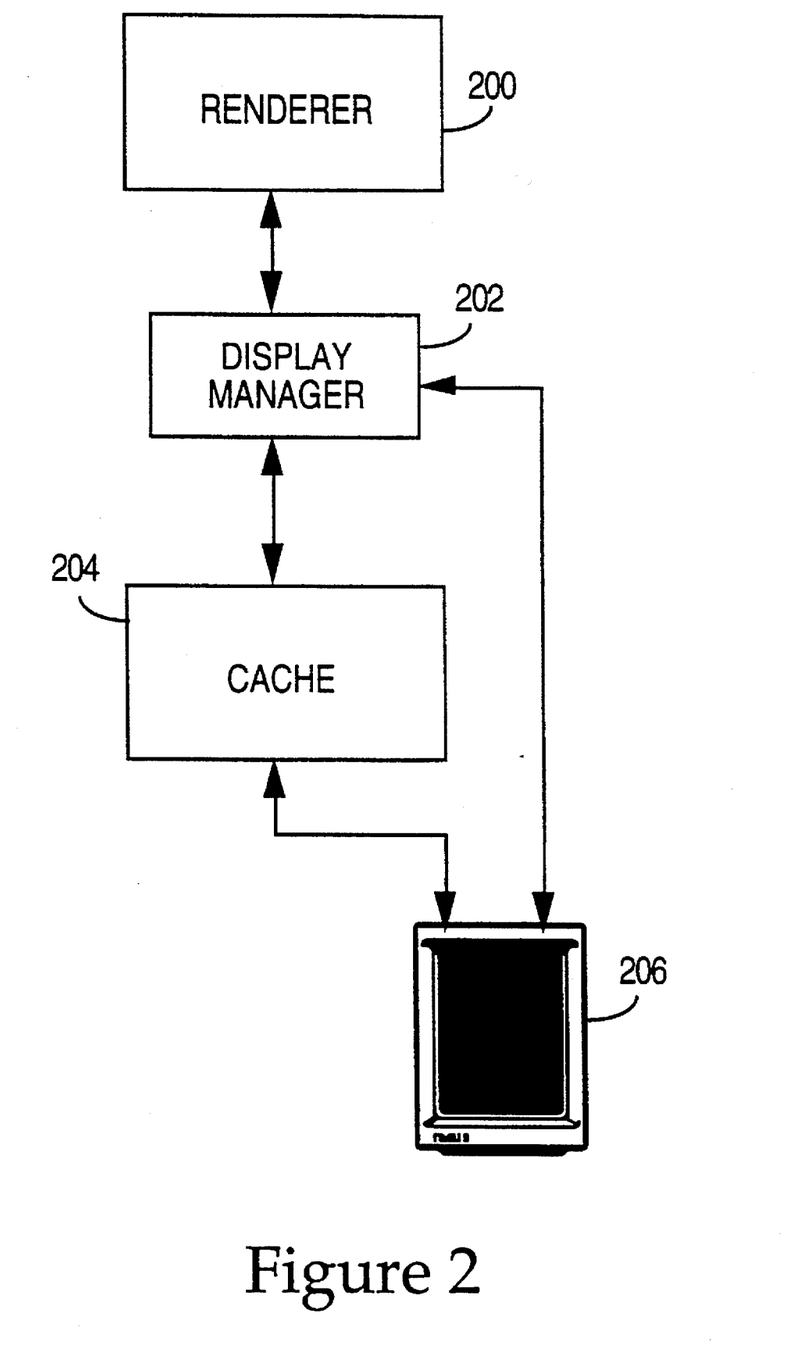
FIG. 2 is an illustrative block diagram showing the general functions of rendering, caching and displaying.

FIG. 2 is a block diagram illustrating the general flow of information of the system. The system of FIG. 2 could be implemented using a combination of hardware and software, the particular balance being of no particular moment. For example, the cache 204 could be a mere software object which is created on an as-needed basis. And while the elements are shown as being separate, this is for the purpose of illustration only. The general functions shown in FIG. 2 could be performed by various elements taking on particular aspects of the overall function described to be performed by a particular block of FIG. 2. For example, the display manager 202 is charged with either sending a graphic rendered by 200 to display 206, or cache 204, usually depending on what has been requested by the developer. Therefore, display manager 202 merely represents the overall ability of the system to either send rendered graphics to display(s) 206, or cache 204. The block diagram of FIG. 2 merely represents the overall functions and elements involved with the rendering of graphics in the present system. The general flow of information begins with renderer 200, which provides rendered graphic information to display(s) 206. The renderer responds to a request for rendering. A display manager 202 communicates with the renderer 200, the cache 204, and display(s) 206. In particular, the display manager entity 202 will either send the rendered graphic to the display(s) 206 or cache 204.

Again, it must be emphasized that FIG. 2 is not intended to show particular hardware elements which make up the system, but rather is meant to represent overall system capabilities which are carried out in implementing the present invention. A more detailed description of a possible implementation of the present system is provided below.

The caching system of the present invention is performed explicitly at the request of a developer, Requiring the developer to make explicit requests for caching is advantageous for several reasons. First, the size of the cache storage can be considerable depending on the size of the graphic, Second, there is no automatic way of detecting when a graphic might be redrawn frequently enough to benefit from caching. Third, the shape, density, and rendering time of the graphic determine the relative benefits of caching. For example, caching a simple rectangle actually degrades performance, because rectangle rendering is usually faster than copying and masking data from an image cache. A cached diagonal line also renders more slowly, because many pixels contained in the bounding rectangle are stored and ignored in comparison to the relatively sparse rendered data. But in many other situations, cached graphics can improve the performance of repetitive drawing significantly.

To achieve optimal performance, a cached graphic must be stored in a device-dependent manner so that the cached image can be transferred directly to the device with little or no interpretation (such as scaling, bit-depth translation, color look-up, etc.). A graphic which is displayed on a system with multiple monitors can appear on different device types, so multiple cached images must be supported.

Figure 3:
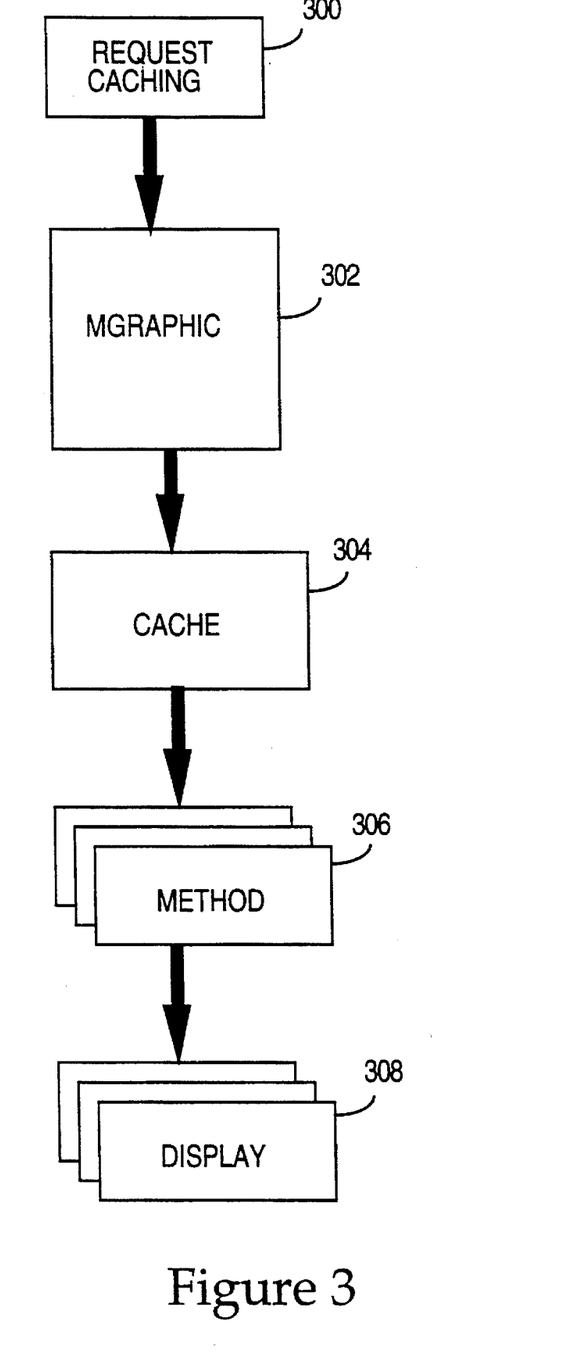
FIG. 3 demonstrates the flow of processing several cached representations, which may be sent to any method, and displayed on a potentially wide array of devices.

The following additional considerations guide a preferred embodiment of the present invention, as shown in FIG. 3:

The ability to cache any MGraphic. A developer should be able to select any MGraphic (whether it exists today or is developed in the future) and request that it be cached, as shown by the arrow between 300 and 302. Furthermore, one should be able to pass the cached representation to any method 306 that takes an MGraphic argument, as represented by the arrow between 302 and 304, and the result should render identically on the display device 308, except perhaps faster. This implies that the cached graphic class is a subclass of MGraphic.

No illicit knowledge. MGraphic has no knowledge of the devices 308 upon which it is rendered, and devices have no knowledge of MGraphics (everything is broken into individual geometries and bundles by the time it reaches the device). It is important to preserve these relationships with respect to the cached MGraphics.

Control of rendering expense. Due to the computational expense of some rendering operations, it is important for the developer to determine when such computation is performed. This implies optional control of lazy evaluation.

No duplication of caches. When a system has two identical display devices, a cached image should be prerendered and stored only once.

Role of Application Developer

Figure 4:
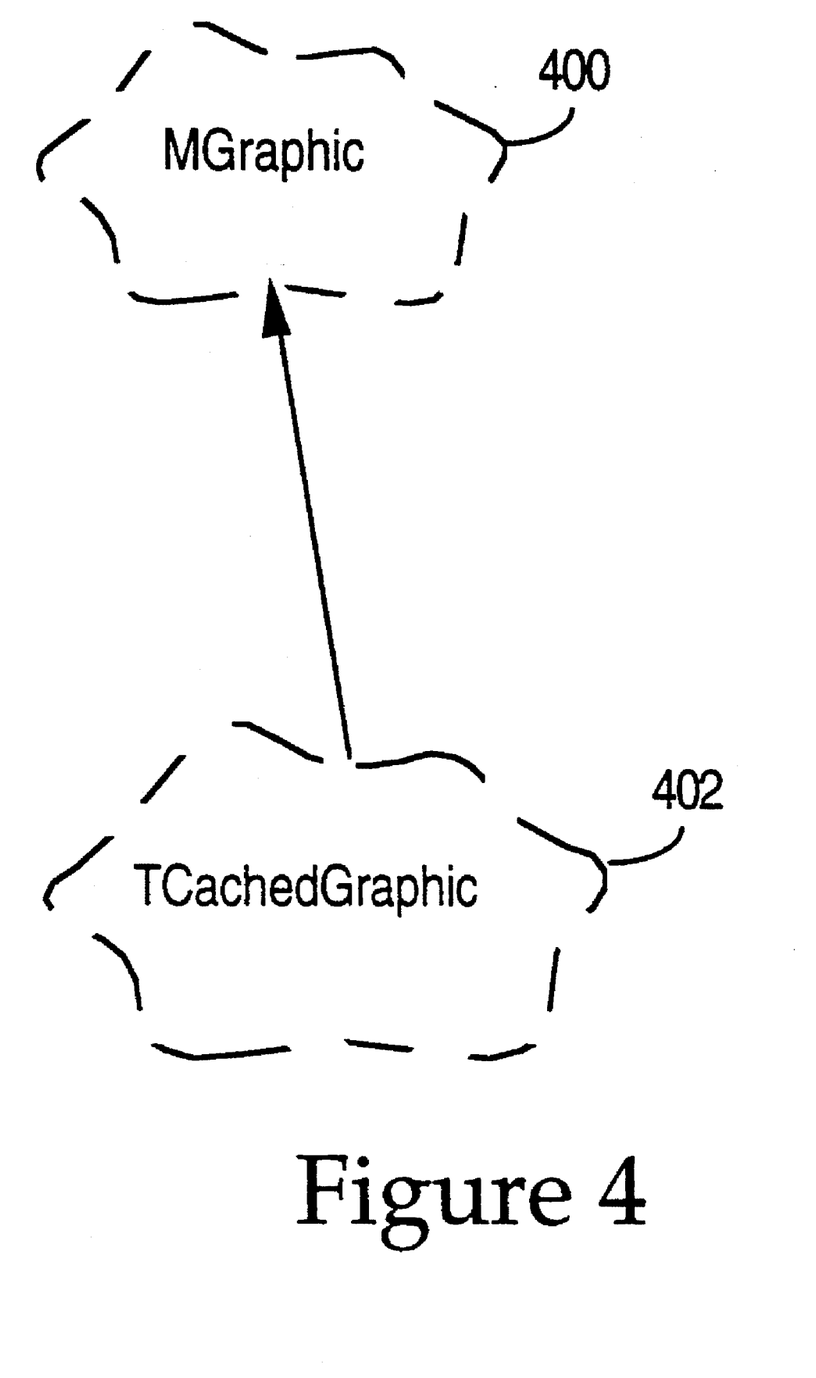
FIG. 4 illustrates the relationship between TCachedGraphic and MGraphic which is preserved by a preferred embodiment of the present invention.

FIG. 4 represents the relationship between TCachedGraphic 402 and MGraphic 400, in accordance with a preferred embodiment. As shown by FIG. 4, TCachedGraphic 402 is a subclass of MGraphic 400. The subclass TCachedGraphic 402 carries out the features listed above. The app developer uses the MGraphic-inherited interface to TCachedGraphic 402. Although there are some important restrictions that govern performance (discussed later), the developer uses a TCachedGraphic object 402 the same way he would use any MGraphic 400. The only important difference is the constructor:

```
TCachedGraphic ( const MGraphic& graphicToBeCached,
        Boolean optimizeForTranslation = FALSE
);
```

The MGraphic 400 argument is copied, so the original MGraphic 400 can be deleted or modified without affecting the TCachedGraphic 402. A TGrafPort pointer cannot be passed in at the time the TCachedGraphic constructor is called, TGrafPort may advantageously contain a complete set of all TGrafDevices on the system or alternatively contain only those TGrafDevices it appears on. The TGrafPort must be passed in later with a setter function. If the GrafPort pointer is NIL, caches are generated only when they are actually needed (the first time the TCachedGraphic is rendered on a particular device). The Boolean argument allows further caching based on different translations. This is intended to accelerate a graphic which will be displayed at many different positions (at the expense of increased storage requirements, of course).

Use of TCachedGraphic

In order to obtain maximum benefits from TCachedGraphic 402, it is important to understand what TCachedGraphics will and won't do. Based on these abilities and limitations, the application developer can decide how to utilize TCachedGraphic 402 to optimize performance of the graphics system.

First, it is important to recognize situations in which TCachedGraphic will not improve rendering performance.

TCachedGraphics will not be appropriate in the following cases:

The graphic is only rendered only once or twice.

The graphic is simple (a rectangle or sparse graphic such as a diagonal line).

You plan to do transformations or other operations on the graphic that will blow away the cache.

Some appropriate uses of TCachedGraphics are:

Sprite implementation (the same graphic moves across the DeskTop)Cursors,

Rubberbands and Menus.

Icons and user visible controls that may move around the DeskTop and cross screens.

When in doubt, a developer could do performance testing to determine the benefit of caching a particular MGraphic. Unless the expected savings are significant, TCachedGraphic should not be used, because the additional memory usage will have a performance cost in production code.

The developer should also understand that actual speed improvements are highly device-dependent. A cached polygon might render significantly faster on a dumb framebuffer, but slower on a device with polygon acceleration hardware.

The architecture allows a particular device to refuse caching, but this decision is made on a wholesale basis, not on a particular MGraphic type. Therefore, a device that accepts caching might have slower rendering times for some cached graphic primitives. On the other hand, a device with accelerated blit hardware might see even greater speed improvements due to caching.

Figure 5:
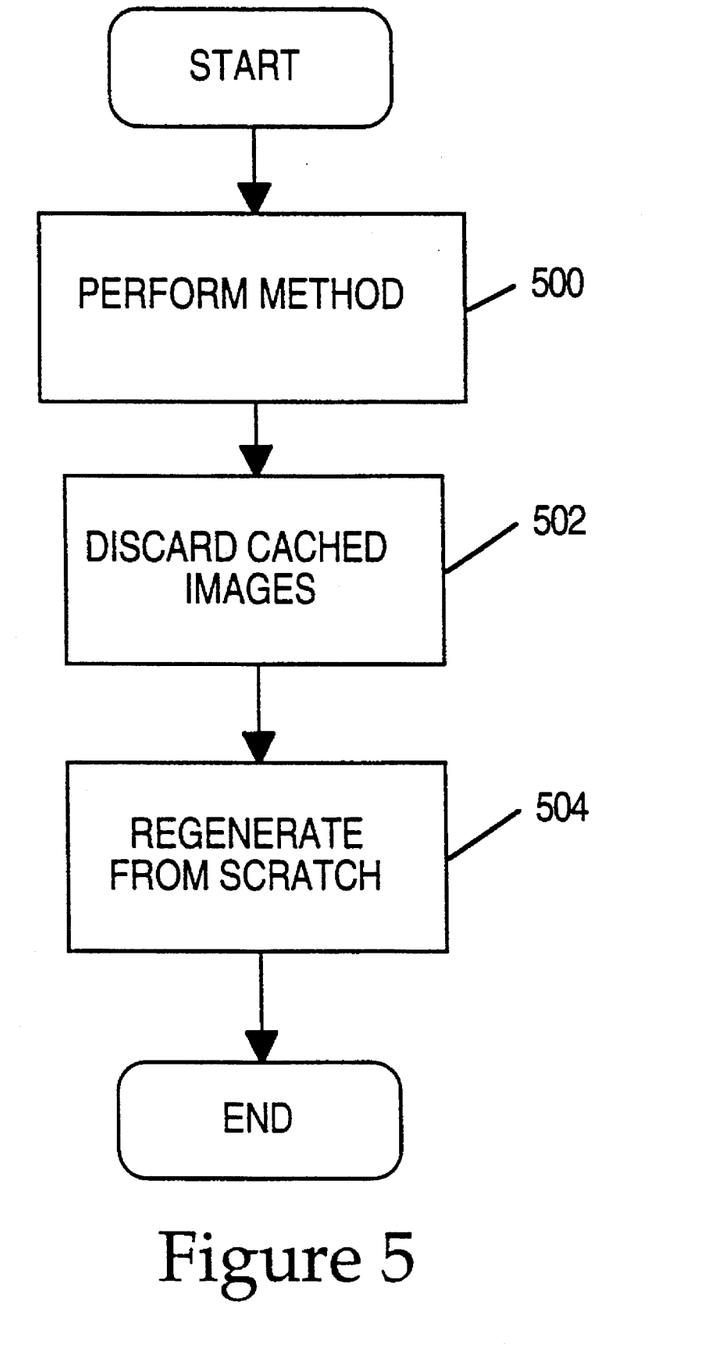
FIG. 5 shows TCachedGraphic support of several methods.

TCachedGraphic 402 is intended for use primarily with static graphics that do not frequently change shape, size, rotation, or bundle attributes. Because TCachedGraphic 402 is an MGraphic 400 subclass, it supports methods such as TransformObjectBy, ScaleObjectBy, and SetBundle. As shown in FIG. 5, TCachedGraphic 402 responds to these methods by transforming, scaling, or setting the bundle on its encapsulated MGraphic, at 500, discarding its cached images, at 502, and then regenerating them from scratch, at 504. Although cache regeneration can be performed using lazy evaluation on a multiple monitor system, this process is not cheap. Graphics that are frequently modified in this manner are not good candidates for caching. Alternatively, if a particular MGraphic is used mostly at n different scale factors or rotations (where n is some small integer), separate TCachedGraphic objects should be employed using the different versions of the MGraphic in each constructor. In order to fully benefit from the use of caches, TCachedGraphic prefers to freeze the MGraphic's current transformation and bundle settings at constructor time.

The behavior of TCachedGraphic can lead to some pathological situations. For example, suppose a TCachedGraphic is passed to a method that magnifies it using a scale factor of 10. In response, caches are generated that are 100 times bigger than the developer anticipated. A graphic that normally renders in 32×32 pixels might require about 8K of cache storage for a two-monitor system. If this suddenly becomes 800K, the speed savings may be destroyed by the cost of paging additional memory.

Figure 6:
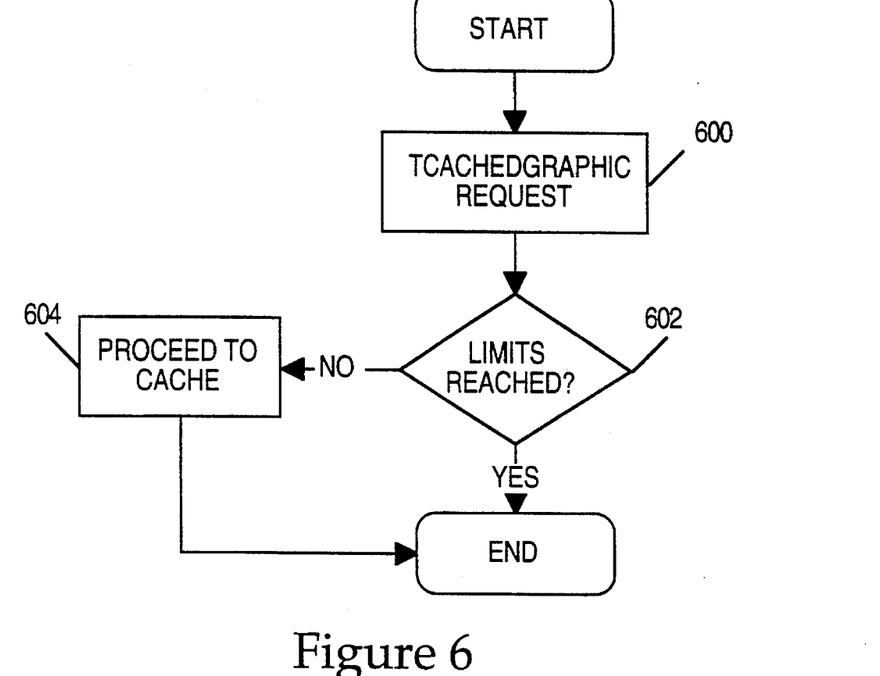
FIG. 6 illustrates the ability of the present system to use discretion in caching if certain conditions in the system are being exceeded.

As shown in FIG. 6, to address these issues, specialized subclasses of TCachedGraphic providing different cache behavior may be used. For example, upon receiving a caching request at 600, if particular limits would be reached at 602, then the caching is not carried out. If the limits are not reached, the process proceeds to cache at 604.

Figure 7:
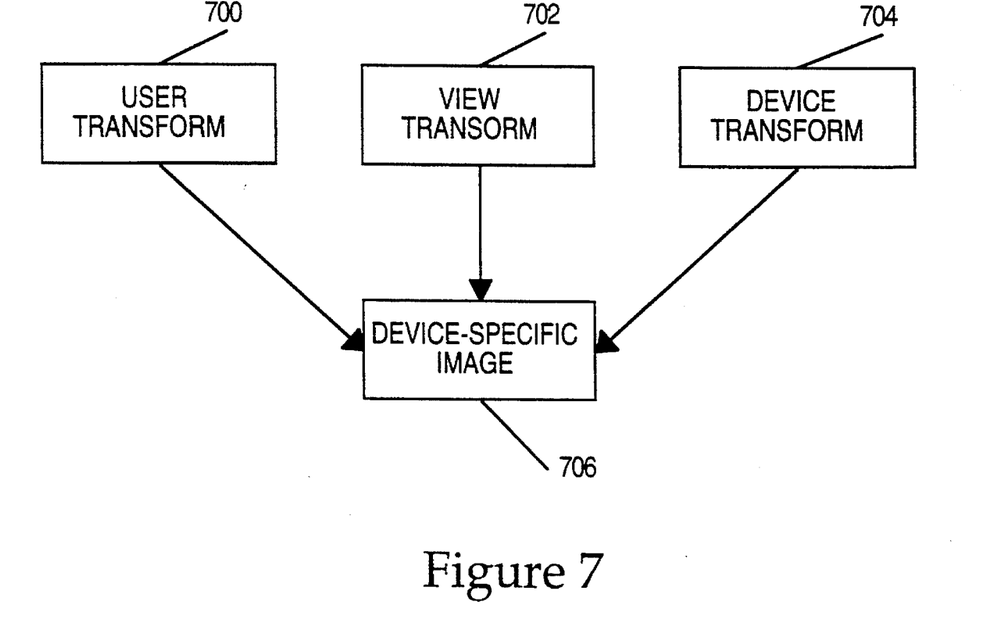
FIG. 7 is a block diagram showing the possible transforms which take place for device specific images.

As shown in FIG. 7, TCachedGraphic caches device-specific images 706 using the total rendering transform (including the user transform 700, view transform 702, and device transform 704). When rendering into multiple views, the developer should consider using multiple TCachedGraphics. If a single TCachedGraphic is rendered alternately in two views with differing scale factors or rotations, caches will be thrashed between the different draw calls.

TCachedGraphic class

Following is the definition of the TCachedGraphic class.

```
class TCachedGraphic: public MGraphic, public
MGraphicCache {
    public:
                TCachedGraphic (
                    const MGraphic&,
                    TGrafPort* port = NIL,
                    Boolean optimizeForTranslation =
    FALSE);
                TCachedGraphic ( );
                TCachedGraphic ( const
    TCachedGraphic& );
```

```
        virtual             -TCachedGraphic ( );
    //
    // MGraphic overrides
    //
        virtual void        Draw (TGrafPort* port);
        virtual void        GetBounds (TGRect&);
        virtual void        TransformObjectBy (const
    TMatrix&);
        virtual void        ScaleObjectBy (
                                const TGPoint&,
                                const TGPoint& );
        virtual void        TranslateObjectBy (const TGPoint&
    );
        virtual void        TransformObjectBy3D (const
    TMatrix3D& m);
        virtual void        TranslateObjectBy3D (const
    TGPoint3D& );
        virtual void        ScaleObjectBy3D (
                                const TGPoint3D&
                                const TGPoint3D& );
        virtual const TGrafBundle* GetBundle ( ) const;
        virtual void        SetBundle (const TGrafBundle& );
        // === Base Functionality ===
        Boolean             operator== ( const
    TCachedGraphic& ) const;
        TCachedGraphic&     operator= ( const
    TCachedGraphic& source );
        // === MCollectible ===
        MCollectibleDeclarationsMacro (TCachedGraphic);
        virtual TStream&    operator>>= (TStream&)
    const;
        virtual TStream&    operator<<= (TStream&);
        virtual Boolean IsEqual(const MCollectible*) const;
    //
    // MGraphicCache overrides
    //
        // Note: these methods are called only by
    TGrafDevice.
        virtual void        Render ( TGrafDevice& dest, const
    TGrafState&,
                                Boolean deviceWantsCaching );
        virtual void        PreRender ( TGrafDevice& dest,
    const TGrafState& );
        virtual void        FlushCache ( );
    };
```

TCachedGraphic overrides MGraphic methods such as TransformObjectBy and ScaleBy, because these methods invalidate caches and cause them to be flushed.

The streaming operators do not stream cached images due to their size. A resurrected TCachedGraphic must rerender its caches.

The overridden methods from MGraphicCache are intended to be called only by TGrafDevice. These will be explained more fully in the architectural section of this document.

An example

The following code fragment illustrates common usage of TCachedGraphic:

```
void DrawSomeEllipses ( TGrafPort* port )
{
    TEllipse normalEllipse ( TGEllipse ( TGRect ( 10,10,
20,20 ) ),
            TGrafBundle ( TRGBColor ( 0, 0, 0 ) ) );
    TCachedGraphic fastEllipse ( normalEllipse );
    // draw 50 ellipses the old way...
    int i;
    TGPoint offset ( 5, 5 );
    for ( i = 0; i < 50; i++ ) {
        normalEllipse.Draw ( port );
        normalEllipse.TranslateObjectBy ( offset );
    }
    // draw 50 ellipses fast (the first one will be slow
because the
    // cache will be initialized the first time)
    // NOTE: Final rendered result is indistinguishable
from previous loop
    for ( i = 0; i < 50; i++ ) {
        fastEllipse.Draw ( port );
        fastEllipse.TranslateObjectBy ( offset );
    }
    // scale the ellipse
    TGPoint scale ( 1.05, 1.05 );
    fastEllipse.ScaleObjectBy ( scale );       // caches are
discarded
    fastEllipse.Draw ( port );                 // this is slow;
cache must be regenerated
    // demonstrate how a cached graphic can be used
wherever an
    // uncached MGraphic is expected
    void DoSomethingWithMGraphic ( MGraphic& );
    DoSomethingWithMGraphic ( fastEllipse );
}
```

The underlying architecture

The remainder of this document explores the architecture beneath TCachedGraphic, how it's rendered, and further implications on overall system design and the video device architecture.

There are several goals that the cached graphic architecture of the present invention satisfies:

1. It should be fast, and as simple as possible.

2. GrafDevices should not know about MGraphics.

3. GrafDevices should be robust (they shouldn't call code which might crash).

4. Both TGrafDevice and TCachedGraphic (or a subclass) should be given an opportunity to decide if it's appropriate to cache a particular graphic.

Some of these goals tend to conflict in particular embodiments, as noted below.

Implementation candidate 1

In both of the following designs, the cached images for a particular graphic are stored within TCachedGraphic. The only other possibility would have been caching within TGrafState, where matrix and painter caches are currently stored. But this would only allow caching of the last n MGraphics rendered, and caching decisions would be outside the developer's control.

The first strategy to render a cached graphic uses a multiple pass process. During the first pass, GrafDevices are divided into three groups: 1) GrafDevices for which a cache of the given graphic already exists, and can be rendered onto immediately; 2) GrafDevices that want a cache, but need one to be allocated and initialized; and 3) GrafDevices that don't want caching, but would prefer rendering to take place directly from the original MGraphic.

The simple implementation would employ two new GrafDevice (GrafCluster) methods; one that produces three lists of underlying GrafDevices according to the classification mentioned above, and a second method which renders a graphic cache on a particular GrafDevice. Unfortunately, this ignores the fact that all graphic caches will already exist most of the time, and the initial classification pass is unnecessary overhead. The overhead can be eliminated by combining the two methods into one, which renders on all devices that have caches during the first pass, and then generates caches and tries again only when necessary. But the semantics are very complex.

Therefore, this preferred embodiment violates the first architectural goal, because of the difficulty of making it fast and simple.

Implementation candidate 2

Figure 8:
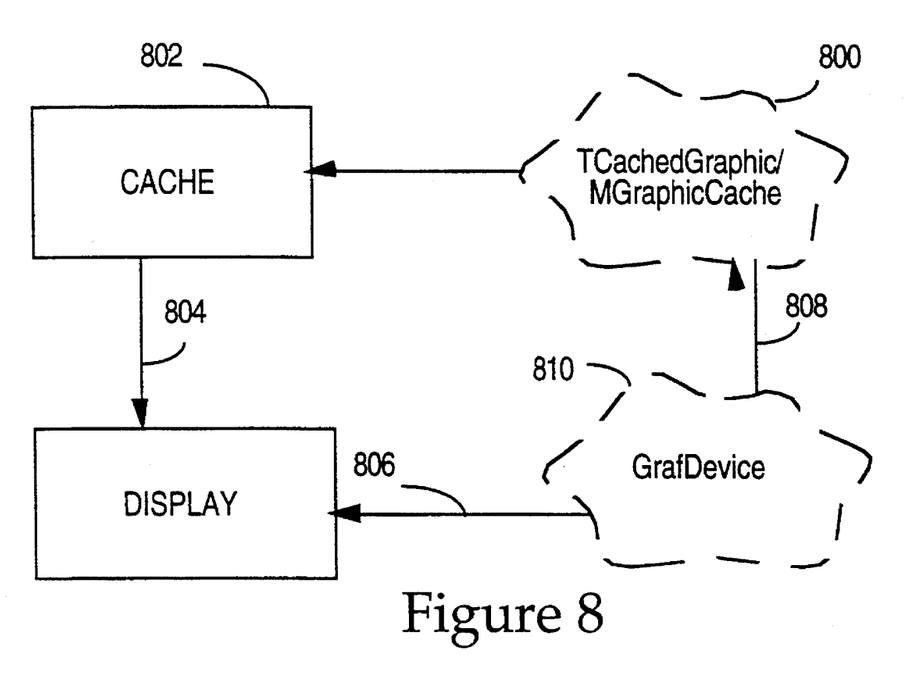
FIG. 8 is a block diagram illustrating the ability to generate a cache, render from a cache, or render without a cache.

The second strategy uses a call-back strategy to avoid multiple passes. FIG. 8 is a block diagram of this implementation. In this solution, a new mix-in class, MGraphicCache, is mixed into TCachedGraphic, represented collectively as 800. This provides an interface which the GrafDevice 810 can call directly (808) to achieve the desired behavior (generate a cache 802, render from a cache 804, or render without a cache 806). This approach is clean and simple, but it violates architectural goal number 3, because a TCachedGraphic subclass could override methods which are called by TGrafDevice. There is no guarantee that these overridden methods will execute in a bounded amount of time, or that they won't contain buggy code. This might even be a security issue. On the other hand, if it's a big problem, the system could be implemented with the requirement that secure devices don't use cached graphics.

Note also that a GrafDevice can make a call that causes a TGrafPort creation and execution of MGraphic::Draw. These are higher-level objects and methods being forced into action by a low-level call. At this time, no compelling argument has been discovered about why this might be a bad idea. For example, it is difficult to see whether this would present difficulties if the system were part of a server-based graphics architecture. This preferred embodiment has speed and simplicity.

TCachedGraphic Rendering

To perform accelerated rendering, TCachedGraphic passes itself down a special pipeline made available at the TGrafPort and TGrafDevice levels through the following new methods:

```
virtual void TGrafPort::Draw ( MGraphicCache& );
virtual void TGrafDevice::RenderGraphicCache (
    MGraphicCache&,
    const TGrafState& );
```

These methods take an MGraphicCache, which is a mix-in for TCachedGraphic. Note the non-const status of the MGraphicCache argument. Since MGraphicCache might generate new device images in response to this call, it is obviously not bit-wise const (by contrast, all other TGrafDevice::RenderXXX methods take const arguments). Depending upon the implementation, caches may or may not be semantic const.

The MGraphicCache mix-in allows TCachedGraphic to pass itself down the pipeline without requiring TGrafDevice to know about an MGraphic subclass like TCachedGraphic. The definition of MGraphicCache follows

```
class MGraphicCache {
    public:
        MGraphicCache ( );
        MGraphicCache ( const MGraphicCache&
    );
    virtual       ~MGraphicCache ( );
    virtual void  Render (TGrafDevice& destination,
    const TGrafState&,
```

```
        Boolean deviceWantsCaching ) = 0;
    virtual void  PreRender ( TGrafDevice& dest,
    const TGrafState& );
    virtual void  FlushCache ( );
};
```

Figure 9:
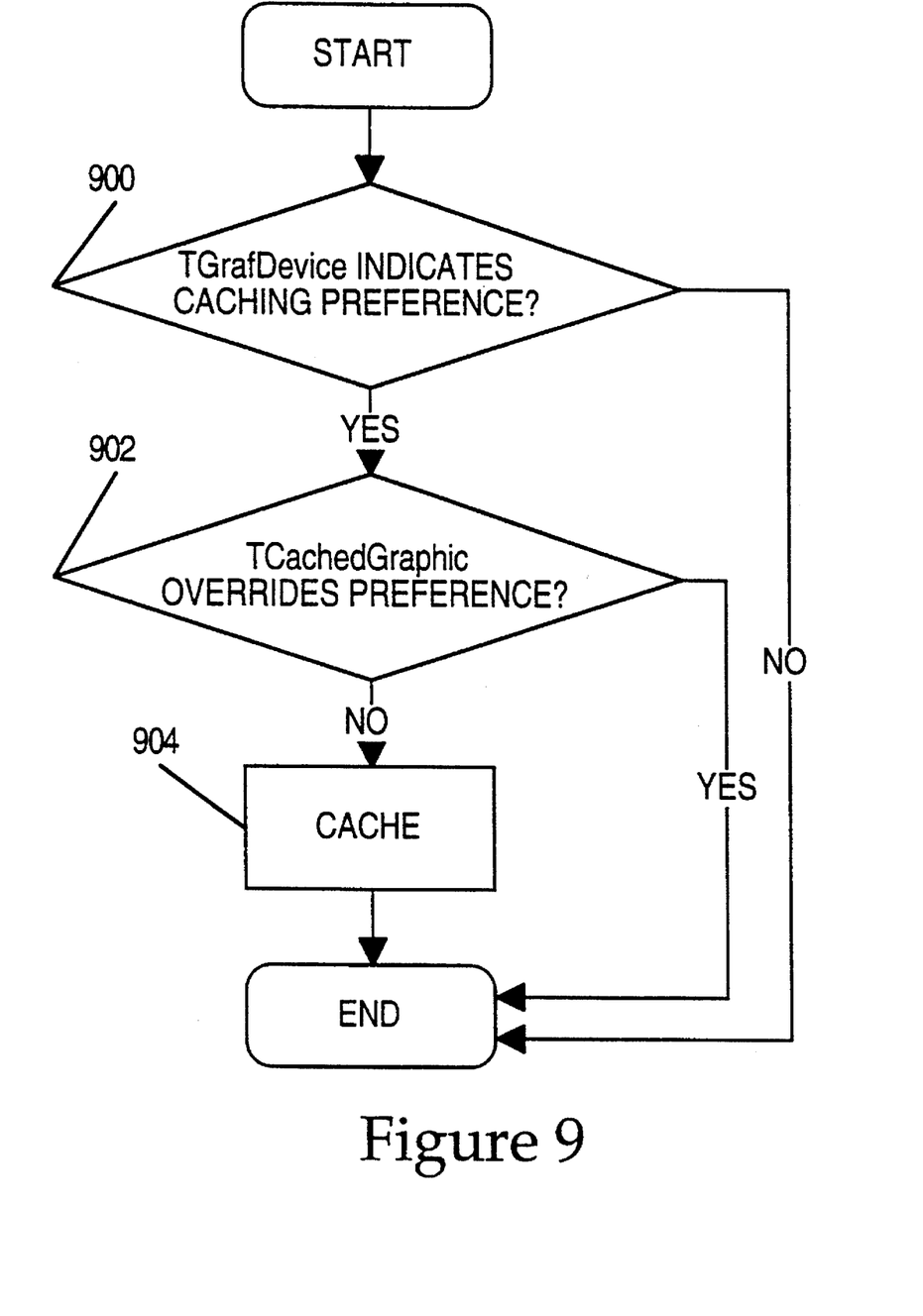
FIG. 9 is a flowchart demonstrating the processing of preferences expressed by a TGrafDevice.

A TGrafDevice calls the MGraphicCache::Render method with a Boolean argument indicating its preference for caching. FIG. 9 demonstrates the decision process with respect to caching preferences. This preference is usually static (a printer might never want caching, because the amount of memory would overwhelm the performance benefit). The device's preference to use caching, at 900, might still be vetoed by a particular TCachedGraphic subclass, at 902, depending on its caching strategy. If a preference is indicated and not overridden, caching is carried out at 904. For example, a device might normally use caches, but a particular TCachedGraphic might determine that the cache size would be excessive. Note that TCachedGraphic and its subclasses can never make the opposite veto: if the device doesn't want caching, TCachedGraphic is not allowed to try anyway. The device might not have implemented some of the methods needed for caching.

The MGraphicCache::PreRender method generates a cache for the destination device without actually displaying it. This is used when a TCachedGraphic is created for display in a particular GrafPort, and lazy generation of caches is not desired for performance reasons later on.

Typical Execution

Let's take a look at the TCachedGraphic rendering process. TCachedGraphic stores a cached image for a device in a TGrafDevice subclass that matches the device. In order to distinguish between the cached image and the destination device, since they both may use the same class, we have introduced a typedef for TGrafDevice:

```
typedef  TGrafDevice  TDeviceImage;
```

This allows differentiation of these different uses of TGrafDevice in the code.

Figure 10:
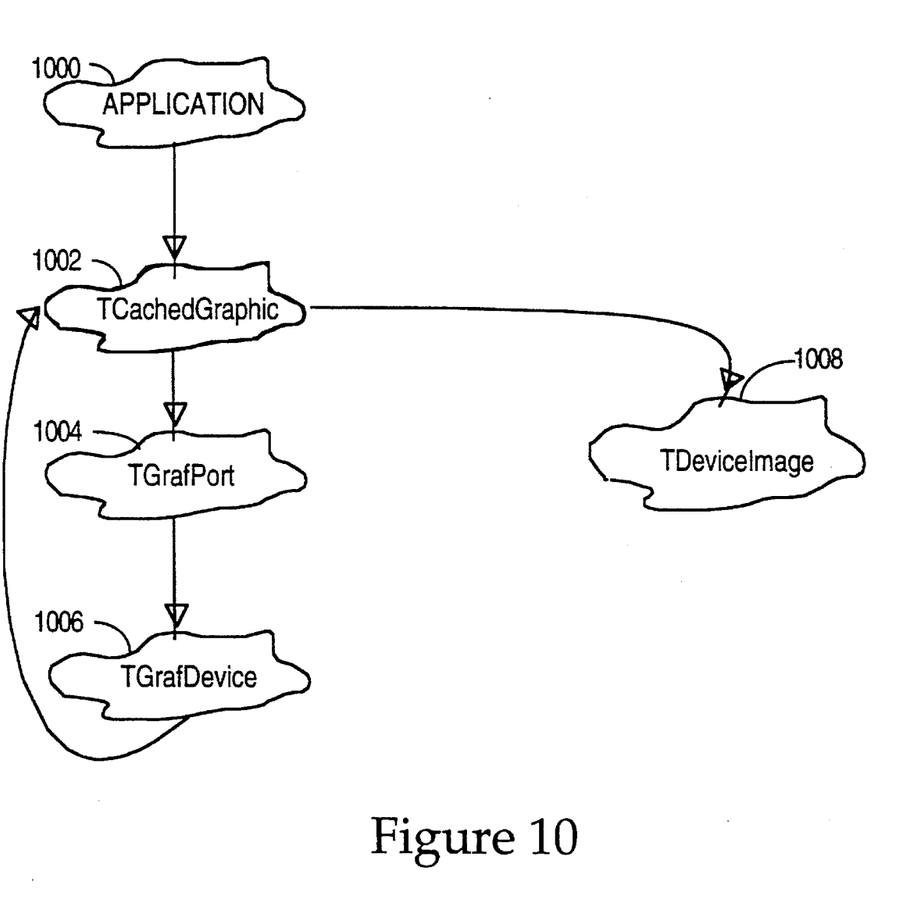
FIG. 10 illustrates a typical execution path.

FIG. 10 illustrates a typical execution path. When a TCachedGraphic 1002 is asked by an application 1000 to draw (step 1), it passes itself down a special rendering pipeline using its MGraphicCache interface (2). The TGrafPort 1004 does its usual job of collecting the GrafState. Then it passes the MGraphicCache and the TGrafState to the TGrafDevice 1006 (step 3). TGrafDevice decides whether it is appropriate to use a cache on its device (it calls WantsGraphicCache, which is overridden by subclasses). It indicates this preference for caching or not in the Boolean it passes to the MGraphicCache::Render method (4).

Figure 11:
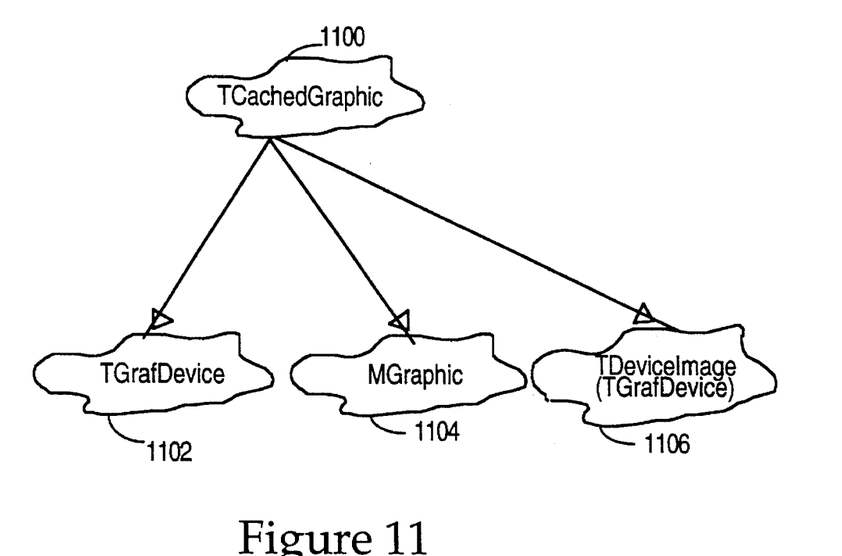
FIG. 11 is a continuation of the typical execution path of FIG. 10.

The Render method of TCachedGraphic now has all the information it needs to decide whether to render its enclosed MGraphic from scratch, or whether it should render it from a cache. If the former, it simply constructs a TGrafPort on top of the destination device and calls MGraphic::Draw(). If the latter, TCachedGraphic must see if an appropriate device image already exists. It does this by calling FindDeviceImage on its caches represented by TDeviceImage (actually a TGratDevice or TGrafCluster) (5). FIG. 11 takes the story from here. Steps (6) and (7) are required only if TCachedGraphic 1100 doesn't find a matching device image already available. In this case, it asks the destination device TGrafDevice 1102 to create a device image for caching, and it passes the MGraphic 1104 bounds so that a device image with the appropriate size can be created. The Boolean argument allows creation of a device image capable of alignment optimization. TCachedGraphic 1100 constructs a TGrafPort on top of the resulting TDeviceImage 1106 (which is actually a TGrafDevice), and then renders into it using MGraphic::Draw(). Finally, in step (8), the device image is blitted to the destination device.

What the device developer sees

In addition to the new RenderGraphicCache method, TGrafDevice has seven new methods to support cached graphics. For most flamebuffer-derived classes, the developer does not need to override any of these methods. Most are implemented at the TGrafDevice level or the TPixelBuffer level. If the developer's new framebuffer device uses a memory format that is not supported by existing TPixelBuffer subclasses, the developer will need to subclass his own TPixelBuffer and override a couple of methods at that level.

A developer of a non-framebuffer device must decide whether caching is really appropriate for his device. If not, he overrides the WantsGraphicCaches method to return FALSE. Then the developer doesn't have to worry about any of the other methods.

Figure 12:
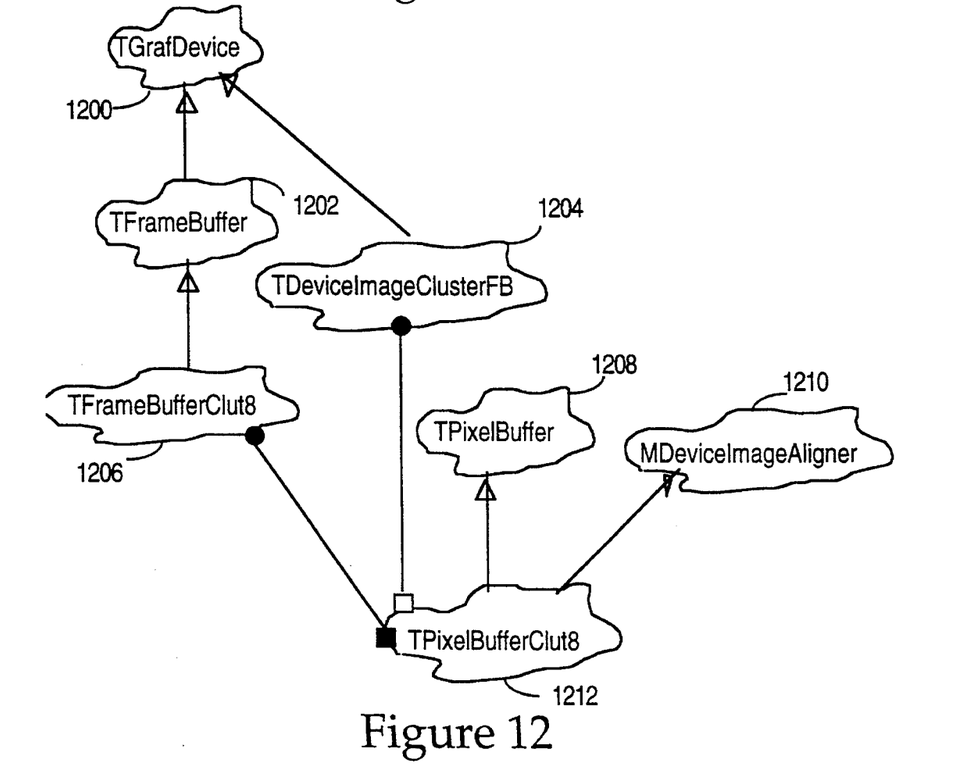
FIG. 12 diagrams class relationships.

FIG. 12 is a diagram of class relationships (class and object diagram) that might be of interest to a device developer. Next to each class are the methods of TGrafDevice that would typically be implemented in that class. These class names and TGrafDevice member function names are for purposes of example only. FIG. 12 merely represents a particular grouping of objects and relations. The details of FIG. 12 will become apparent from the discussion below.

Following is a summary of the new proposed TGrafDevice 1200 methods, along with a description of what they do and where they would usually be overridden,

```
virtual Boolean TGrafDevice::WantsGraphicCaches ( ) const
    { return TRUE; };
```

WantsGraphicCaches is overridden only by TGrafDevice subclasses that don't want caching. This is typically the case when the storage required for caches would overwhelm the performance improvement.

```
virtual TToken TGrafDevice::GetDeviceImageType ( )
    const;
```

TCachedGraphic needs to match the caches it maintains with real display devices. It uses GetDeviceImageType to match tokens returned by real devices and cached images. When a match is found, the cached image can be displayed on the device without further ado.

Note that this must be accomplished using a method more complicated than simply matching the class name. Different classes might use identical pixel buffers, and therefore have matching caches. But even identical pixel buffers don't match in cases where they have different color lookup tables.

GetDeviceImageType is typically implemented by TPixelBuffer 1208 subclasses. The returned token encodes bit depth, clut seed, orientation, and dpi. A cache must be deleted when its corresponding device changes one of these attributes. Proposed methods can be found in the "GrafDevice configuration changes" section of this document.

```
virtual TDeviceImage* TGrafDevice::FindDeviceImage (
    const TToken& deviceImageType ) const;
```

When more than one type of display device is present in a system, multiple device images are kept in a TGrafCluster. In order to find the appropriate device image for a particular device, a method is required so that the TGrafCluster can recursively search its children for the appropriate device image.

FindDeviceImage is implemented only by TGrafDevice and TGrafCluster.

```
virtual TDeviceImage* TGrafDevice::CreateDeviceImage (
    const TGRect& bounds,
    Boolean optimizeForTranslation,
    const TGrafState& ) const;
```

CreateDeviceImage creates an appropriate device image for a device. Usually, this just involves cloning the device with a buffer large enough to contain the bounds rectangle. The Boolean argument specifies whether a device should create a more complex device image that deals with alignment issues. This will be discussed in greater detail below.

CreateDeviceImage is implemented by TFrameBuffer 1202 to call the corresponding TPixelBuffer 1208 method.

```
virtual void TGrafDevice::DeviceImageBlit (
    TGrafDevice* destinationDevice,
    const TGPoint& position,
    const TGrafState& );
```

DeviceImageBlit transfers the device image pointed to by "this" DeviceImage to the destination Device. At present it is implemented by TFrameBuffer 1202, and does not normally need to be overridden by subclasses.

```
virtual void TGrafDevice::PreRender (
    MGraphicCache&,
    const TGrafState& );
```

PreRender allocates storage for and renders a device image for "this" TGrafDevice 1200. This method is used during initial creation of caches when prerendering is desired.

```
virtual void TGrafDevice::FinishGraphicCaches ( );
```

A device image may require additional initialization after an MGraphic is rendered into it. Without a separate call, it doesn't know when the MGraphic has finished rendering, because the MGraphic may consist of many different geometries that are each rendered separately. There is normally no flag to indicate when the last geometry in an MGraphic has been rendered. This is currently used only by an aligned device image, discussed below.

Alignment Optimization

When TCachedGraphic is used to implement something like a sprite, which moves frequently around the display, alignment optimization becomes important on framebuffer devices. By storing multiple device images with different alignments, the expense of shifting the device image at rendering time is avoided.

Since not all GrafDevices have alignment considerations, one goal of the present invention was to hide alignment issues from the TGrafDevice interface. This is accomplished by returning a more complex TGrafDevice (TDeviceImage) subclass from the CreateDeviceImage method, called TDeviceImageClusterFB 1204.

TDeviceImageClusterFB 1204 is constructed with a number of empty slots corresponding to the number of different alignments possible on the device. TDeviceImageClusterFB 1204 doesn't know a lot about how to select a particular slot or how to fill an empty slot. It gets this information by calling two methods in the MDeviceImageAligner 1210 mix-in. This class gets mixed into pixel buffers that support alignment optimization.

The two relevant MDeviceImageAligner 1210 methods are:

```
virtual short MDeviceImageAligner::Alignment ( const
    TGPoint& ) const;
virtual TPixelBuffer*
MDeviceImageAligner::CreateAlignedPixelBuffer (
    short alignment ) const;
```

The first method returns an alignment number corresponding to a particular TGPoint. By passing the top left point of a device image destination, TDeviceImageClusterFB 1204 can determine which device image it should use to avoid expensive shifting. If it doesn't have a device image corresponding to that particular alignment, it can call CreateAlignedPixelBuffer, and create a framebuffer with the returned pixel buffer.

GrafDevice Configuration Changes

When a GrafDevice undergoes a configuration change (e.g., pixel depth, clut, or orientation changes), the corresponding device image becomes useless. If configuration changes are frequent (as they might be on a variable-clut device), the growing number of outdated caches will become burdensome in two ways: 1) they will consume a lot of memory, and 2) they will slow down cached rendering, because their presence will add overhead to the search for the correct cache.

In order to avoid these unpleasant consequences, it is necessary to flush caches when they become invalid.

There are two very obvious solutions to this problem. The first solution would require a cached graphic user to specifically flush caches by invoking a FlushCache method. However, since TCachedGraphic can be used anywhere an MGraphic is, a user of TCachedGraphic may only be using it polymorphically as an MGraphic, and hence would not know to call FlushCache.

The second solution would require usage of a notification mechanism involving IPC across teams.

The favored solutions involve time stamp checking whenever a cached graphic is rendered. Two possibilities are considered. The first involves time stamp checking at the level of the GrafPort. If a GrafPort's time stamp is different from the time stamp stored in a TCachedGraphic, all caches are flushed before rendering proceeds. Alternatively, time stamps can be stored in TGrafDevice instead of TGrafPort. This might allow more selective flushing of caches when only one device out of a cluster is reconfigured.

While the invention has been described in terms of a preferred embodiment in a specific system environment, those skilled in the art recognize that the invention can be practiced, with modification, in other and different hardware and software environments within the spirit and scope of the appended claims,

Having thus described our invention, what we claim as new, and desire to secure by Letters Patent is:

1. An apparatus for caching comprising:
   (a) processor means;
   (b) storage means attached to the processor means;
   (c) a graphics caching system for creating and managing cache objects, including means for receiving caching requests from an application;
   (d) at least one cache object for performing at least one caching function with respect to at least one rendered graphic; and
   (e) an application for requesting caching, where the cache object includes means which are device dependent.

2. The apparatus of claim 1, wherein the application includes means for receiving caching requests from a user.

3. The apparatus of claim 1, wherein the cache object includes a rendered graphic.

4. The apparatus of claim 1, wherein the graphics system creates multiple cache objects of a graphic for multiple devices.

5. The apparatus of claim 1, wherein the graphic system includes means for creating a single cache object for multiple devices.

6. The apparatus of claim 1, wherein the graphics caching system includes means for determining whether limits are exceeded; and means for not caching a requested caching operation if the limits are determined to be exceeded.

7. The apparatus of claim 1, including devices which provide caching preferences.

8. The apparatus of claim 1, wherein the preferences are selectively overridden by the graphics caching system.

9. The apparatus of claim 1, wherein the cache object includes a cached graphic which is transferred to a device in a manner identical to a non-cached graphic object.

10. The apparatus of claim 1, wherein the cache object includes a cached graphic which is transferred to logic resident in said cache object in a mariner identical to a non-cached graphic.

11. The apparatus of claim 1, wherein the graphics system includes means for caching different versions of the same graphic.

12. The apparatus of claim 11, wherein the means for caching different versions of the same graphic includes means for altering alignment of a graphic.

13. The apparatus of claim 1, wherein the graphics system includes means for prerendering a graphic to cache without rendering to a display device.

14. A method for caching comprising:
   providing a graphics caching system for creating and managing cache objects in a storage means;
   generating a caching request from an application;
   receiving caching requests from an application; and
   creating at least one cache object in the storage means in response to the request, wherein the step of creating at least one cache object includes creating device dependent characteristics.

15. The method of claim 13, wherein the step of generating includes receiving caching requests from a user.

16. The method of claim 14, wherein the step of creating at least one cache object includes rendering a graphic.

17. The method of claim 14, including a step of creating multiple cache objects of a graphic for multiple devices.

18. The method of claim 14, including a step of creating a single cache object for multiple devices.

19. The method of claim 14, including determining whether limits are exceeded; and not performing a requested caching operation if the limits are determined to be exceeded.

20. The method of claim 14, including generating caching preferences from a device.

21. The method of claim 20, including selectively overriding the preferences.

22. The method of claim 14, including transferring a cached graphic to a device in a manner identical to a non-cached graphic object.

23. The method of claim 14, including transferring a cached graphic to a method in a manner identical to a non-cached graphic.

24. The method of claim 14, including caching different versions of the same graphic.

25. The method of claim 24, wherein the step of caching different versions includes the step of altering alignment of a graphic.

26. The method of claim 14, including prerendering a graphic to cache without rendering to a display device.

* * * * *